(12) United States Patent
Chakravarthy et al.

(10) Patent No.: US 12,530,657 B2
(45) Date of Patent: Jan. 20, 2026

(54) SYSTEMS AND METHODS OF DECANTING INVENTORY PRODUCTS FROM CASES AT A RETAIL FACILITY

(71) Applicant: Walmart Apollo, LLC, Bentonville, AR (US)

(72) Inventors: Sunada Chakravarthy, Metuchen, NJ (US); Vivek Tomar, Cincinnati, OH (US); Rei Siew Hew Sam, New York, NY (US); Kaiwen Luo, Atlanta, GA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/101,771

(22) Filed: Jan. 26, 2023

(65) Prior Publication Data

US 2023/0281556 A1    Sep. 7, 2023

Related U.S. Application Data

(60) Provisional application No. 63/304,956, filed on Jan. 31, 2022.

(51) Int. Cl.
*G06Q 10/087* (2023.01)
(52) U.S. Cl.
CPC ................... *G06Q 10/087* (2013.01)
(58) Field of Classification Search
CPC ...... G06Q 10/087; G06Q 50/28; G06Q 10/08; B65B 5/12; B65B 59/00; B65B 65/00; B65B 5/04; B65B 1/04; B65B 61/00
See application file for complete search history.

(56) References Cited

U.S. PATENT DOCUMENTS 6,688,459 B1   2/2004 Bonham
8,086,344 B1 * 12/2011 Mishra ................. G06Q 10/087
                                                            700/214

(Continued)

FOREIGN PATENT DOCUMENTS

WO    2001027567    9/2001
WO    2020185081    9/2020

(Continued)

OTHER PUBLICATIONS

PCT; PCT/US23/11600; Internationl Search Report and Written Opinion mailed May 15, 2023.

(Continued)

*Primary Examiner* — Florian M Zeender
*Assistant Examiner* — Kimberly S. Bursum
(74) *Attorney, Agent, or Firm* — Fitch, Even, Tabin & Flannery LLP (57) ABSTRACT

Systems for decanting inventory products from cases at a retail facility include a loading zone that receives product cases, decanting stations having associated containers with an amount of available space therein, and a decanting transport system that transports the product cases from the loading zone to the decanting stations and has sensors that obtain information relating to the product cases. A processor-based control circuit receives from the sensors information relating to product cases being transported from the loading zone by the decanting transport system, selects a subset of the product cases, analyzes one or more business rules governing decanting to assign each product case in the subset to a decanting station, and causes the decanting transport system to divert each product case in the subset to its assigned decanting station based on the one or more business rules.

18 Claims, 7 Drawing Sheets

(56) References Cited

U.S. PATENT DOCUMENTS

| | | | |
|---|---|---|---|
| 8,234,006 B1* | 7/2012 | Sachar | G06Q 10/087 700/214 |
| 9,230,233 B1* | 1/2016 | Sundaresan | G06Q 50/30 |
| 9,460,524 B1 | 10/2016 | Curlander | |
| 10,138,062 B2 | 11/2018 | High | |
| 10,246,275 B1 | 4/2019 | Lehmann | |
| 10,339,491 B2 | 7/2019 | Wakim | |
| 10,769,579 B1 | 9/2020 | Smith | |
| 11,001,438 B2 | 5/2021 | Eisenman | |
| 11,003,804 B2 | 5/2021 | Krishnamurthy | |
| 11,049,086 B2 | 6/2021 | Brooks | |
| 11,074,547 B2 | 7/2021 | Rajkhowa | |
| 11,142,402 B2 | 10/2021 | Lert, Jr. | |
| 11,948,120 B2 | 4/2024 | Tomar | |
| 11,954,641 B2 | 4/2024 | Tomar | |
| 12,013,686 B1 | 6/2024 | Parness | |
| 12,288,188 B2 | 4/2025 | Tomar | |
| 12,293,322 B2 | 5/2025 | Tomar | |
| 2013/0218799 A1* | 8/2013 | Lehmann | G06Q 10/063 705/337 |
| 2015/0161317 A1* | 6/2015 | Moffitt | G06F 30/18 716/122 |
| 2017/0043953 A1 | 2/2017 | Battles | |
| 2018/0178992 A1 | 6/2018 | Gondoh | |
| 2018/0194556 A1 | 7/2018 | Lert, Jr. | |
| 2018/0247257 A1 | 8/2018 | Lert, Jr. | |
| 2018/0374046 A1 | 12/2018 | Powers | |
| 2019/0233213 A1 | 8/2019 | Phan-Quiroga | |
| 2019/0276176 A1 | 9/2019 | Almogy | |
| 2019/0322454 A1 | 10/2019 | Wan | |
| 2019/0378232 A1* | 12/2019 | Goren | G06Q 10/083 |
| 2019/0389659 A1 | 12/2019 | Grinnell | |
| 2020/0039668 A1 | 2/2020 | Que | |
| 2020/0039746 A1* | 2/2020 | Lert, Jr. | B65B 21/00 |
| 2020/0087010 A1 | 3/2020 | Almogy | |
| 2020/0167727 A1 | 5/2020 | Ikeda | |
| 2020/0283245 A1* | 9/2020 | Gualtieri | B65G 65/30 |
| 2020/0306973 A1 | 10/2020 | Edwards | |
| 2020/0379440 A1 | 12/2020 | Ziegler | |
| 2020/0380746 A1* | 12/2020 | Natesan | G06T 17/10 |
| 2021/0103886 A1 | 4/2021 | Sezaki | |
| 2021/0149382 A1 | 5/2021 | Stadie | |
| 2021/0158272 A1 | 5/2021 | Barr | |
| 2021/0221619 A1 | 7/2021 | Lert, Jr. | |
| 2021/0241209 A1 | 8/2021 | Kim | |
| 2021/0256460 A1 | 8/2021 | Young | |
| 2022/0106121 A1* | 4/2022 | Puite | B65G 1/137 |
| 2022/0134543 A1* | 5/2022 | Amend, Jr. | B65G 1/1378 700/245 |
| 2022/0135351 A1* | 5/2022 | Hickman | B65B 5/108 414/294 |
| 2022/0164765 A1* | 5/2022 | Masche-Pakkala | G06Q 10/08345 |
| 2023/0124552 A1* | 4/2023 | Sarkar | G06N 5/01 706/45 |
| 2023/0245034 A1 | 8/2023 | Tomar | |
| 2023/0245059 A1 | 8/2023 | Tomar | |
| 2023/0281557 A1 | 9/2023 | Vivek | |
| 2024/0193529 A1 | 6/2024 | Tomar | |
| 2024/0211878 A1 | 6/2024 | Tomar | |
| 2025/0232248 A1 | 7/2025 | Tomar | |

FOREIGN PATENT DOCUMENTS

| | | | |
|---|---|---|---|
| WO | 2021239559 | 12/2021 | |
| WO | 2021243059 | 12/2021 | |
| WO | WO-2021239559 A1 * | 12/2021 | B65G 1/04 |
| WO | WO-2021243059 A1 * | 12/2021 | G06Q 10/087 |
| WO | 2023146940 | 8/2023 | |
| WO | 2023146942 | 8/2023 | |
| WO | 2023146950 | 8/2023 | |
| WO | 2023146953 | 8/2023 | |

OTHER PUBLICATIONS

PCT; PCT/US23/11603; Internationl Search Report and Written Opinion mailed May 16, 2023.

U.S. Appl. No. 18/101,493, filed Jan. 25, 2023, Vivek Tomar.

U.S. Appl. No. 18/101,780, filed Jan. 26, 2023, Vivek Tomar.

U.S. Appl. No. 18/101,791, filed Jan. 26, 2023, Vivek Tomar.

Geeksforgeeks; "Bin Packing Problem (Minimize number of used Bins)"; <https://www.geeksforgeeks.org/bin-packing-problem-minimize-number-of-used-bins/>; Jul. 28, 2021; pp. 1-17.

Van Aken, Margo; "An efficient bin-packing algorithm for packing groceries in a fulfillment center"; <https://repository.tudelft.nl/islandora/object/uuid%3Af4ee26b5-b94e-4cd3-9c7a-c281b0c8d8a8>; Mar. 8, 2019; 85 pages.

PCT; PCT/US23/11588; International Search Report and Written Opinion mailed Apr. 17, 2023; 12 pages.

PCT; PCT/US23/11590; International Search Report and Written Opinion mailed Apr. 14, 2023; 13 pages.

U.S. Appl. No. 18/101,493; Non-Final Rejection mailed Sep. 7, 2023; (pp. 1-17).

U.S. Appl. No. 18/101,791; Non-Final Rejection mailed Sep. 14, 2023; (pp. 1-31).

U.S. Appl. No. 18/101,780; Non-Final Rejection mailed Oct. 20, 2023; (pp. 1-18).

U.S. Appl. No. 18/101,780; Notice of Allowance and Fees Due (PTOL-85) mailed Jul. 28, 2025; (pp. 1-8).

* cited by examiner

SYSTEMS AND METHODS OF DECANTING INVENTORY PRODUCTS FROM CASES AT A RETAIL FACILITY

CROSS-REFERENCE TO RELATED APPLICATION

This application claims the benefit of U.S. Provisional Application No. 63/304,956, filed Jan. 31, 2022, which is hereby incorporated by reference in its entirety.

TECHNICAL FIELD

This invention relates generally to managing product inventory and, in particular, to systems and methods for decanting inventory products from cases at a retail facility.

BACKGROUND

Automated storage and retrieval systems ("AS/RS") are often used by large retail entities to store products and manage inventory. AS/RS systems are generally configured to store and retrieve loads (e.g., products) from storage locations in a storage facility or fulfillment center. In a typical AS/RS system, when a load of products is received at a storage facility or fulfillment center, the system identifies the received products and conveys them to a particular location in the facility for storage. In some approaches, a group of products received in a shipment may be conveyed to a single storage location. In other approaches, a number of individual products from the shipment may be placed into a storage container (i.e., decanted), which is then conveyed to a particular storage location. Given the cost associated with storing large numbers of products in a storage facility, improving storage efficiency and container utilization can significantly increase capacity and/or decrease storage, operating, and fulfillment costs.

BRIEF DESCRIPTION OF THE DRAWINGS

Disclosed herein are embodiments of systems, apparatuses and methods pertaining to decanting inventory products from cases at retail or distribution facilities. This description includes drawings, wherein.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, this disclosure relates to decanting inventory products from product cases at a retail facility. "Decanting" is the process by which cases of products are received from a supplier, vendor, etc. and individual products are removed from the cases and placed into available containers for storage. In conventional decanting systems and processes, product cases may be randomly diverted to the decanting stations. The systems, apparatuses and methods described herein utilize one or more business rules to assign product cases (or groups of product cases) to particular storage containers in order to maximize container utilization. The systems, apparatuses and methods described herein may be particularly useful with automated storage and retrieval systems. However, the systems, apparatuses and methods described herein are not limited to use with such systems.

An exemplary decanting system includes a plurality of decanting stations configured for unpacking products from product cases and placing the products in storage containers. Each available decanting station may be supplied with one or more containers for storing the decanted products. In some approaches, the container may be provided, and/or stored in, an automated storage and retrieval system. In other approaches, the container may be manually or electronically provided by other suitable means. Each container provided to the decanting stations has an amount available space for receiving one or more products to be stored. In some approaches, the containers at the decanting stations may be empty prior to receiving the one or more products. In other approaches, the containers may already contain one more products from previous decanting processes.

The decanting system further includes a loading zone, where product cases may be removed from trailers, pallets, or other shipping means and loaded onto a decanting transport system. The decanting transport system is configured to transport the product cases from the loading zone to the decanting stations.

A control unit is operatively coupled to the decanting transport system and configured to control movement of the decanting transport system. In some approaches, the decanting transport system comprises one or more sensors configured obtain information relating to the product cases as the product cases are conveyed to the decanting stations. A processor control circuit communicatively coupled to the control unit obtains certain information about the conveyed product cases from the one or more sensors and, in some approaches, uses the information to select a subset of the product cases and to assign each product case in the subset to a decanting station based on at least one business rule. In some approaches, the information obtained by the sensors and analyzed by the control circuit includes one or more of an identity of a product in the product case, a quantity of the product in the product case, one or more dimensions of the product in the product case, one or more dimensions of the product case, a weight of the product in the product case, and a weight of the product case.

The control circuit may apply one or more business rules to assign each product case to a particular decanting station based on information associated with each product case and may cause the decanting transport system to divert each product case to its assigned decanting station based on the at least one business rule. In some approaches, an exemplary business rule analyzed by the control circuit may comprise a rule configured to determine a utilization value for the containers at each decanting station and the control circuit may be configured to cause the product cases to be diverted to assigned decanting stations based on the containers' utilization values. The utilization values may represent an amount of available space in each container. Another exemplary business rule analyzed by the control circuit may comprise a rule configured to determine a cost function associated with diverting each product case to a decanting station and the control circuit may be configured to cause the product cases to be diverted to assigned decanting stations based on the cost functions. Yet another exemplary business rule analyzed by the control circuit may comprise a rule configured to determine a minimum number of containers required to accommodate all the products in the subset of product cases.

In some approaches, the control circuit may be configured to perform multiple analyses in parallel or successively using at least one different business rule and the control circuit may assign each product case to a decanting station based on an analysis outcome requiring the fewest containers.

Figure 1A:
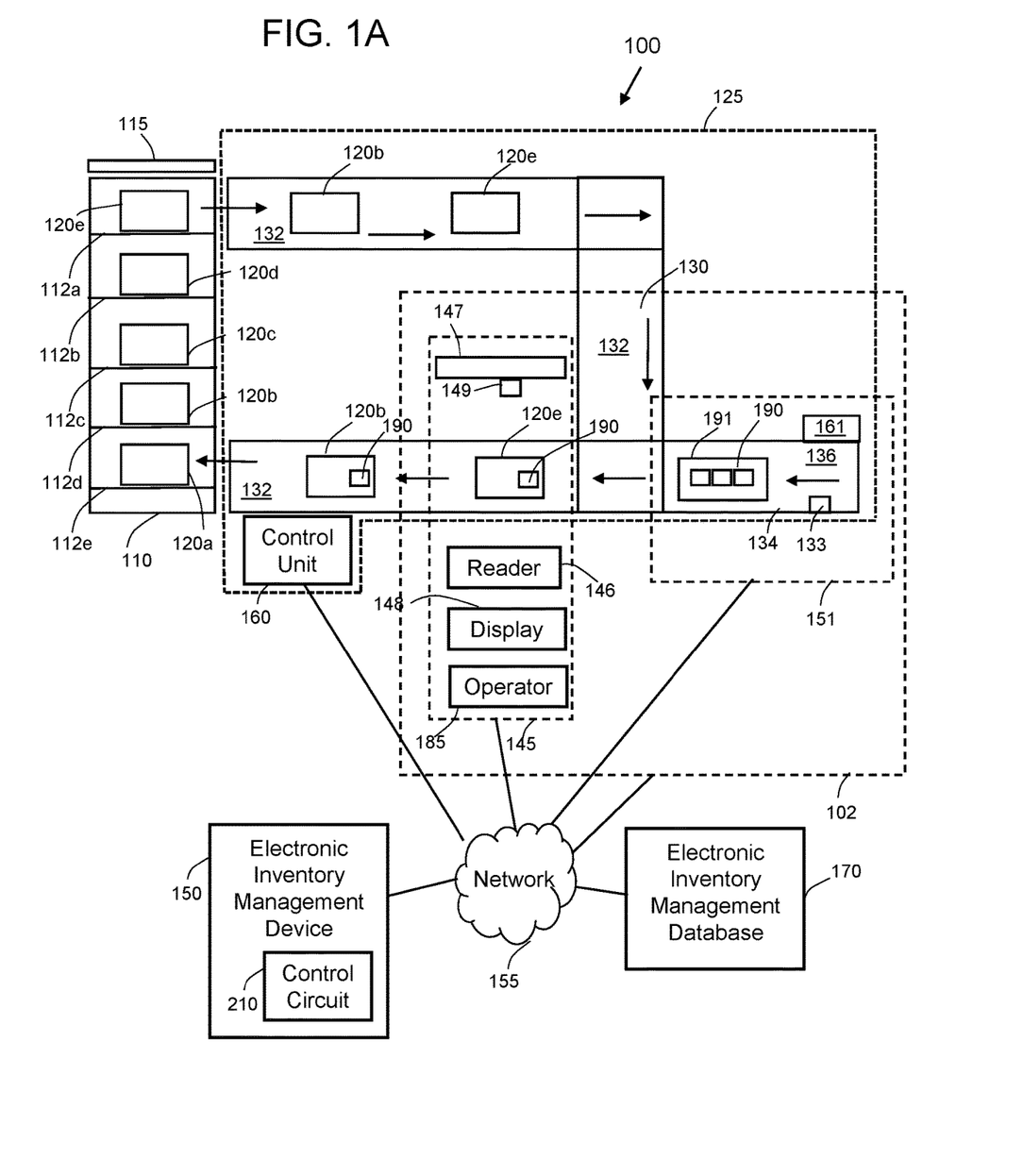
FIG. 1A is a diagram of an exemplary automated storage and retrieval system for managing storage of inventory at a retail facility, in accordance with some embodiments.
Figure 1B:
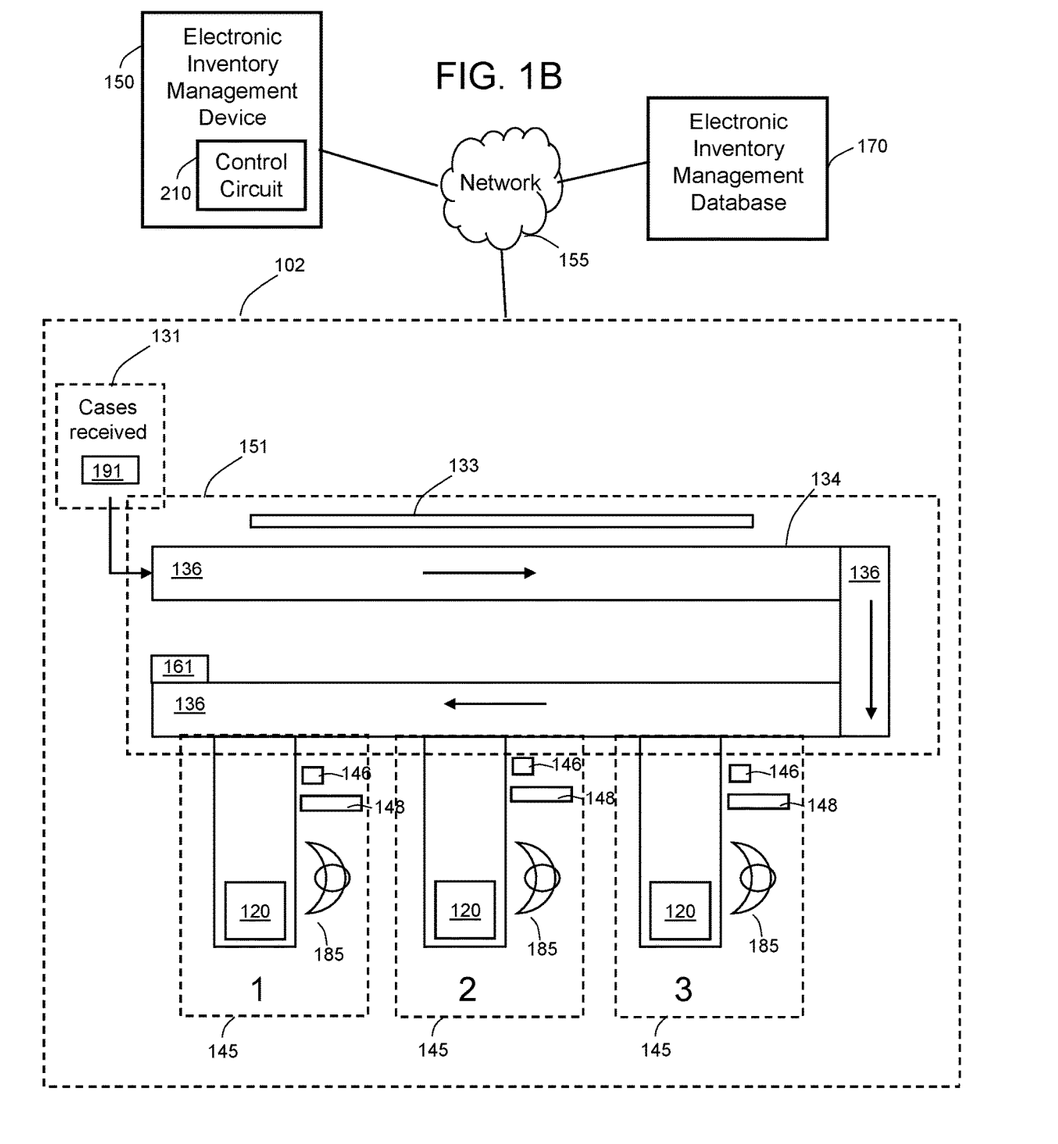
FIG. 1B is a diagram of an exemplary decanting system that may be used with an automated storage and retrieval system at a retail storage facility, in accordance with some embodiments.

FIG. 1A shows an embodiment of an automated storage and retrieval system 100 for managing storage of inventory at a retail facility. FIG. 1B shows an embodiment of an exemplary decanting system 102. As noted above, the decanting system 102 described herein (and/or one or more components thereof) may be particularly useful in an automated storage and retrieval system in a retail storage facility, wherein the decanting system 102 (and/or one or more components thereof) may be operable coupled to an automated storage and retrieval system in a retail storage facility. The retail storage facility may be any entity operating as a brick-and-mortar physical location and/or a website accessible via the internet by way of which products may be purchased by a consumer. A consumer may be an individual or a business entity. Exemplary products that may be ordered by the consumers from the retailer via the system 100 may include, but are not limited to, general-purpose consumer goods, as well as consumable products, such as grocery products and/or other food items, medications, and dietary supplements.

The exemplary automated storage and retrieval system 100 shown in FIG. 1A includes a storage structure 110 including a plurality of storage locations 112a-112e configured to store a plurality of containers (also referred to as totes) 120a-120e, each containing one or more products 190. Notably, while the storage locations 112a-112e (e.g., storage shelves) have been shown in FIG. 1A as each storing one container 120a-120e thereon, it will be appreciated that each of the storage locations 112a-112e may store two or more storage containers 120 thereon.

In the exemplary system 100 of FIG. 1A, the storage structure 110 is operatively coupled to a container transport system 125 configured to transport the containers 120a-120e in the directions indicated by the arrows in FIG. 1A to/from the storage locations 112a-e of the storage structure 110 and to/from at least one packing station 145 (also called a "decanting station"). While FIG. 1A shows only one packing/decanting station 145, it is contemplated that the system 100 may include multiple packing/decanting stations 145, as illustrated in FIG. 1B.

In some embodiments, the container transport system 125 comprises a conveying system including at least a main conveyor 130 configured to convey the containers 120a-120e in the directions indicated by the arrows in FIG. 1A to/from the storage locations 112a-e of the storage structure 110 and to/from at least one packing station 145. The main conveyor 130 may also transport individual products 190, or cases thereof 191, from an unpacking station to the packing station 145. In some embodiments, the container transport system 125 can include non-conveyor-based mechanisms to transport the containers.

The exemplary automated storage and retrieval system 100 shown in FIG. 1A includes a generally U-shaped main conveyor 130, but it will be appreciated that the system 100 may include a differently-shaped main conveyor 130 and/or two or more main conveyors 130, depending on the size of the automated storage and retrieval system and/or the retail facility.

While the main conveyor 130 is illustrated in FIG. 1A as having two product storage containers (120b and 120e) thereon, it will be appreciated that the main conveyor 130, depending on its shape and size, may concurrently transport fewer storage containers 120 thereon, or significantly more storage containers 120 thereon. Further, while only the containers 120b and 120e are shown in FIG. 1A as having products 190 stored therein, it will be appreciated that each of the containers 120a-120e may contain any number (e.g., dozens and/or hundreds) of products 190 therein, depending on the size of the containers 120a-120e and the products 190. Further, the shape and size of the containers 120a-120e and the products 190 in FIG. 1A has been shown by way of example only, and it will be appreciated that the containers 120a-120e and the products 190 may have various shapes and sizes.

In the exemplary system 100 of FIG. 1A, the main conveyor 130 (also referred to herein as "the conveyor 130") has a product advancement surface 132 configured to move one or more products containers 120 or packages 191 in one or more directions indicated by the arrows. The product advancement surface 132 of the conveyor 130 may be comprised of a single conveyor belt surface or may be instead comprised of a series of two or more independently movable conveyor belt.

In some embodiments, one or more of the independently movable conveyor surfaces of the product advancement surface 132 of the conveyor 130 may be configured to stop, while one or more of the other independently movable conveyor sections of the product advancement surface 132 are permitted to move. The conveyor 130 may be a belt conveyor, chain conveyor, or the like, and may have a continuous, uninterrupted product advancement surface 132, or may have a product advancement surface 132 that includes one or more interruptions at the transitions between the distinct, independently movable conveyor surfaces.

The system 100 depicted in FIG. 1A includes a control unit 160 operatively coupled to the conveyor 130 and configured to control movement of the conveyor 130 via one or more control signals. In some embodiments, the control unit 160 is configured to start or stop the movement of the conveyor 130 (or one or more independently movable product advancement surfaces 132 of the conveyor 130) in response to one or more control signals sent from an electronic inventory management device 150 (also referred to herein as a computing device) of the system 100, which will be described in more detail below.

The electronic inventory management device 150 of the exemplary system 100 may be located at the retail facility or remotely relative to the retail facility, and may be a stationary or portable electronic device, for example, a desktop computer, a laptop computer, a tablet, a mobile phone, or any other electronic device including a processor-based control circuit (i.e., control unit). In the embodiment of FIGS. 1A and 1B, the electronic inventory management device 150 is configured for data entry and processing as well as for communication with other devices of system 100 via the network 155. The exemplary network 155 depicted in FIGS. 1A and 1B may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 and/or system 102 may take place over hard-wired, wireless, cellular, Wi-Fi or Bluetooth networked components or the like.

In some embodiments, the system 100 and/or the system 102 may include one or more localized Internet-of-Things (IoT) devices and controllers in communication with the electronic inventory management device 150. As a result, in some embodiments, the localized IoT devices and controllers can perform most, if not all, of the computational load and associated monitoring that would otherwise be performed by the electronic inventory management device 150, and then later asynchronous uploading of summary data can be performed by a designated one of the IoT devices to the electronic inventory management device 150, or a server remote to the electronic inventory management device 150. In this manner, the computational effort of the overall system 100 may be reduced significantly. For example, whenever a localized monitoring allows remote transmission, secondary utilization of controllers keeps securing data for other IoT devices and permits periodic asynchronous uploading of the summary data to the electronic inventory management device 150 or a server remote to the electronic inventory management device 150.

In the embodiment of FIG. 1A, the system 100 includes one or more decanting stations (also referred to as packing stations) 145 (only one is shown in FIG. 1A for simplicity), which may form part of a decanting system 102, and configured to permit a human operator 185 (e.g., a human worker assigned to work at the automated storage and retrieval system 100) to remove products 190 from newly received product cases 191 and place them in one or more containers 120.

In some embodiments, the packing/decanting station 145 may include a movable robotic arm 147 that is positioned and configured to grasp one or more of the products 190 from the newly received cases 191 and place them in one or more of the containers 120 positioned at the packing/decanting station 145 (e.g., container 120e). In certain implementations, the control unit 160 is configured to control the movement of the robotic arm 147 via one or more control signals. For example, the control unit 160 may control the start, stop, and direction of movement of the robotic arm 147 in response to one or more control signals sent from the electronic inventory management device 150. In some embodiment, the robotic arm 147 may not be controlled via the control unit 160, but may be operatively coupled to a separate control unit that is configured to control movement of the robotic arm 147 in response to one or more control signals sent from the electronic inventory management device 150.

In the system 100 of FIG. 1A, the storage structure 110 may include a movable robotic arm 115 that is positioned to have access to the storage locations 112a-112e and configured to grasp one or more of the containers 120a-120e positioned on the storage locations 112a-112e, and to transfer such containers 120a-120e from the storage structure 110 to the main conveyor 130. In certain implementations, the control unit 160 is configured to control the movement of the robotic arm 115 via one or more control signals. For example, the control unit 160 may control the start, stop, and direction of movement of the robotic arm 115 in response to one or more control signals sent from then electronic inventory management device 150. In some embodiment, the robotic arm 115 may not be controlled via the control unit 160, but may be operatively coupled to a separate control unit that is configured to control movement of the robotic arm 115 in response to one or more control signals sent from the electronic inventory management device 150.

In FIGS. 1A and 1B, the decanting stations 145 may include one or more sensors 149 that are positioned and configured to detect the containers 120 at the decanting stations 145, cases 191 that arrive at the decanting stations 145, along with each of the products 190 picked from, placed into, and/or otherwise transferred between the cases 191 and containers 120 by the operator 185 and/or by the robotic arm 147 at the decanting stations 145. Suitable sensors may include, but are not limited to, one or more of a video camera, motion sensor, infrared sensor, bar code sensor, radio-frequency identification (RFID) sensor, laser sensor, or the like.

FIG. 1B illustrates an embodiment of an exemplary decanting system 102. It should be understood that the decanting system 102, or any component thereof, may be used in conjunction with, be associated with, or form any part of the automated storage and retrieval system 100 illustrated in FIG. 1A. Conversely, one or more components of the automated storage and retrieval system 100 illustrated in FIG. 1A may be used in conjunction with, be associated with, or form any part of the decanting system 102 illustrated in FIG. 1B. Additionally, while FIG. 1B depicts a configuration of an exemplary decanting system 102, one or more components of the system 102 may be arranged in any suitable configuration.

An exemplary decanting system 102 may include a loading zone 131 configured to receive product cases 191. Products are generally packaged in cases 191 and shipments of the cases 191 may be received regularly by the retail storage facility. The cases 191 may be transported to the facility, for example, via truck, trailer, or any other suitable transportation means and the cases may be unloaded to an area of the facility (e.g., a loading/unloading dock), which may include, or form part of, the loading zone 131.

The decanting system 102 further includes a plurality of decanting stations 145. Each decanting station 145 may be configured to allow an operator 185 to sit or stand in a manner conducive to packing containers 120 with products 190. The decanting stations 145 may include a display 148 (which may be a stand-alone display or a computing device with a display (e.g., a laptop, tablet, or the like)). The display 148 may provide useful information and/or illustrations about the product cases 191, the products 190 in the cases, and or information about the containers 120 at the decanting stations 145. In some embodiments, the display 148 may provide instructions and/or illustrations to the operator 185 regarding how to pack or otherwise configure the products 190 in the containers 120. In some embodiments, the control circuit 210 of an electronic inventory management device (e.g., electronic inventory management device) may send a signal to the display 148 to cause the display 148 to depict a visual representation to the operator 185 of an optimal packing configuration for packing containers.

In some approaches, each decanting station 145 may include an electronic reader 146 configured to read machine readable codes. The machine readable codes may encode, for example, product identifiers affixed to, or otherwise associated with, inventory products 190 and/or product cases 191, as well as container identifiers associated with the containers 120, and the like. The electronic reader 146 may include one or more optical sensors, image sensors, or other suitable sensors or readers configured to capture images or optically read machine-readable codes (e.g., bar codes, QR codes, etc.). In some approaches, the one or more of the sensors 133 may be a barcode reader or QR code reader configured to read a barcode or QR code affixed to an outside surface of a product case 191.

The decanting system 102 further includes a decanting transport system 151 configured to transport cases 191 from the loading zone 131 to one or more of the decanting stations 145. In some embodiments, the decanting transport system 151 comprises a conveying system including at least a main conveyor 134 configured to convey the cases 191. The exemplary decanting system 102 shown in FIG. 1B includes a generally U-shaped main conveyor 134, but it will be appreciated that the decanting system 102 may include a differently-shaped main conveyor 134 and/or two or more main conveyors 134, depending on the size of the retail storage facility. In some approaches, the main conveyor 134 may be a recirculating conveyor that intermittently collects new product cases 191 from the loading zone 131.

In the exemplary decanting system 102 of FIG. 1B, the main conveyor 134 (also referred to herein as "the conveyor 134") has a product advancement surface 136 configured to move one or more cases 191 in one or more directions indicated by the arrows. The product advancement surface 136 of the conveyor 134 may be comprised of a single conveyor belt surface or may be instead comprised of a series of two or more independently movable conveyor belt.

In some embodiments, one or more of the independently movable conveyor surfaces of the product advancement surface 136 of the conveyor 134 may be configured to stop, while one or more of the other independently movable conveyor sections of the product advancement surface 136 are permitted to move. The conveyor 134 may be a belt conveyor, chain conveyor, or the like, and may have a continuous, uninterrupted product advancement surface 136, or may have a product advancement surface 136 that includes one or more interruptions at the transitions between the distinct, independently movable conveyor surfaces.

A control unit 161 may be operatively coupled to the conveyor 134 and configured to control movement of the conveyor 134 via one or more control signals. In some embodiments, the control unit 161 is configured to start or stop the movement of the conveyor 134 (or one or more independently movable product advancement surfaces 136 of the conveyor 134) in response to one or more control signals sent from an electronic inventory management device (also referred to herein as a computing device) (e.g., electronic inventory management device 150).

In some approaches, the main conveyor 134 of the decanting transport system 151, (and/or the product advancement surface 136 of the conveyor 134), depicted in the decanting system 102 of FIG. 1B may be linked to and/or feed the main conveyor 130 (and/or the product advancement surface 132 of the conveyor 130) of the container transport system 125 of the automated storage and retrieval system 100 depicted in FIG. 1A.

The exemplary decanting system 102 depicted in FIG. 1B may further include one or more sensors 133 associated with the decanting transport system 151 and configured obtain information relating to the product cases 191 being transported by the decanting transport system 151. In some approaches, a portion of the product advancement surface 136 of the main conveyor 130 may be partially surrounded by a structure housing one or more of the sensors 133. For example, the one or more sensors may form part of a tunnel structure through which the product cases 191 are conveyed and the sensors 133 sense or otherwise obtain information about the product cases 191 as the product cases 191 are conveyed through the tunnel.

The sensors 133 may include any sensor suitable for obtaining information from, or about, the product cases 191 (and/or products therein), including, but not limited to, optical readers or sensors, image readers or sensors, weight sensors, infrared sensors, and the like. In some embodiments, the one or more sensors 133 associated with the decanting transport system 151 are sensors configured to capture images or optically read machine-readable codes such as bar codes, QR codes, etc. that may be present on the product cases 191. The machine readable codes may encode information relating to the product cases such as, for example, an identity of a product in the product case, a quantity of the product in the product case, one or more dimensions of the product in the product case, one or more dimensions of the product case, a weight of the product in the product case, and a weight of the product case. As each product case 191 is conveyed by conveyor 134 of the decanting transport system 151 from the loading zone 131 to one of the decanting stations 145, one or more sensors 133 obtain information from each product case 191 and transmit the information to the control circuit 210 and/or an electronic inventory management database (e.g., electronic inventory management database 170.)

In the embodiments shown in FIGS. 1A and 1B, the electronic inventory management device 150 is coupled to and obtains the above-described business rules from an inventory management database 170 (also referred to herein simply as "the electronic database 170"). The electronic inventory management device 150 and the electronic inventory management database 170 may be implemented as a single device or may be implemented as two separate devices as illustrated in FIGS. 1A and 1B and may be located at the same location/facility or at different locations/facilities. The electronic database 170 may be stored, for example, on non-volatile storage media (e.g., a hard drive, flash drive, or removable optical disk) internal or external to the electronic inventory management device 150, or internal or external to computing devices separate and distinct from the electronic inventory management device 150. In some embodiments, the electronic inventory management database 170 may be cloud-based.

In some embodiments, the exemplary electronic inventory management database 170 of FIGS. 1A and 1B is configured to store electronic data associated with the products 190 stored in the containers 120a-120e stored and or transported by the automated storage and retrieval system 100. In certain aspects, the electronic inventory management database 170 may store electronic data indicating one or more of: an identifier and physical location of each of the containers 120a-120e, identifiers of each of the products 190 stored in each of the containers 120a-120e; estimated container/tote utilization value (which may be expressed, for example, as a percentage representing the occupied and/or available storage space for products 190 inside of each of the containers 120a-120e at a given time; association between the products 190 located within the containers 120a-120e that are associated with product orders placed by one or more customers of the retailer (and an indication of the number of units of each product 190 associated with each of the product orders); names and addresses of the customers of the retailer who ordered the products 190 for delivery/pickup. In one aspect, the electronic data representing the available storage space within each of the containers 120a-120e may be in the form of a grid-like map or planogram. In some aspects, the electronic inventory management database 170 is configured to facilitate real-time tracking of the inventory of available storage space inside of the containers 120a-120e and for real-time tracking of the inventory of products 190 controlled by the automated storage and retrieval system 100.

In some embodiments, the exemplary electronic inventory management database 170 of FIGS. 1A and 1B may be configured to store electronic data associated with the products 190 and product cases 191 obtained by the one or more sensors 133 associated with the decanting transport system 151. The exemplary electronic inventory management database 170 may also be configured to store information about products and product cases obtained by vendors, as well as associations between product identifiers and one or more attributes of the products and/or product cases.

Figure 2:
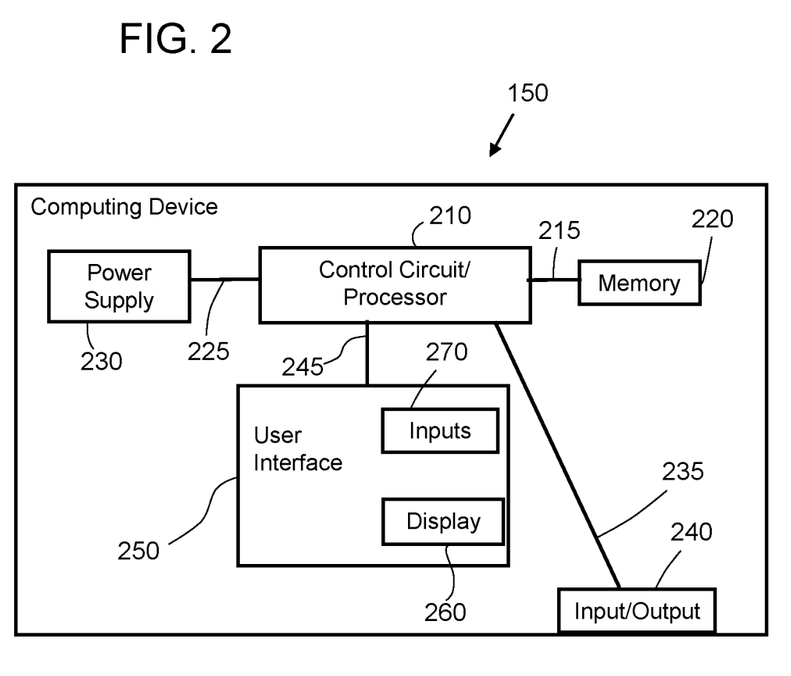
FIG. 2 is a functional diagram of an exemplary electronic inventory management device, in accordance with some embodiments.

With reference to FIG. 2, an exemplary electronic inventory management device 150 configured for use with exemplary systems and methods described herein may include a control circuit or control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description.

This control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control circuit 210 may be referred to as a non-transitory medium or non-transitory computer readable medium.

The control circuit 210 of the electronic inventory management device 150 is also electrically coupled via a connection 235 to an input/output 240 that can receive signals from any of the other electronic components of the system 100 (e.g., control units, sensors, inventory management databases, displays, readers, transport systems, etc.), or from any other source (a regional central server, a hand-held device of a worker, etc.) that can communicate with the electronic inventory management device 150 via a wired or wireless connection. The input/output 240 can also send signals to the control units, sensors, inventory management databases, displays, readers, transport systems, etc. (shown in FIGS. 1A and 1B), or to any other device in wired or wireless communication with the electronic inventory management device 150.

In the embodiment shown in FIG. 2, the processor-based control circuit 210 of the electronic inventory management (or computing) device 150 is electrically coupled via a connection 245 to a user interface 250, which may include a visual display or display screen 260 (e.g., light-emitting diode (LED) screen) and/or button input 270 that provide the user interface 250 with the ability to permit an operator of the electronic inventory management device 150 to manually control the electronic inventory management device 150 by inputting commands via touch-screen and/or button operation and/or voice commands to, for example, set one or more rules relating to container topping-off, container merging, product decanting, and/or product picking by the automated storage and retrieval system 100 and/or the decanting system 102. It will be appreciated that the performance of such functions by the processor-based control circuit 210 of the electronic inventory management device 150 is not necessarily dependent on a human operator, and that the control circuit 210 may be programmed to perform such functions without a human operator.

In some embodiments, the display 260 of the electronic inventory management device 150 is configured to display various graphical interface-based menus, options, and/or alerts that may be transmitted from the electronic inventory management device 150 to, for example, the display 148, the control unit 160, control unit 161, or the like. The inputs 270 of the electronic inventory management device 150 may be configured to permit an operator to navigate through the on-screen menus on the electronic inventory management device 150 and make changes and/or updates to, for example, business rules relating to picking, merging, and/or topping off containers with one or more additional products, as well as business rules relating to decanting of products. It will be appreciated that the display screen 260 may be configured as both a display screen and an input 270 (e.g., a touch-screen that permits an operator to press on the display screen 260 to enter text and/or execute commands.)

Figure 3A:
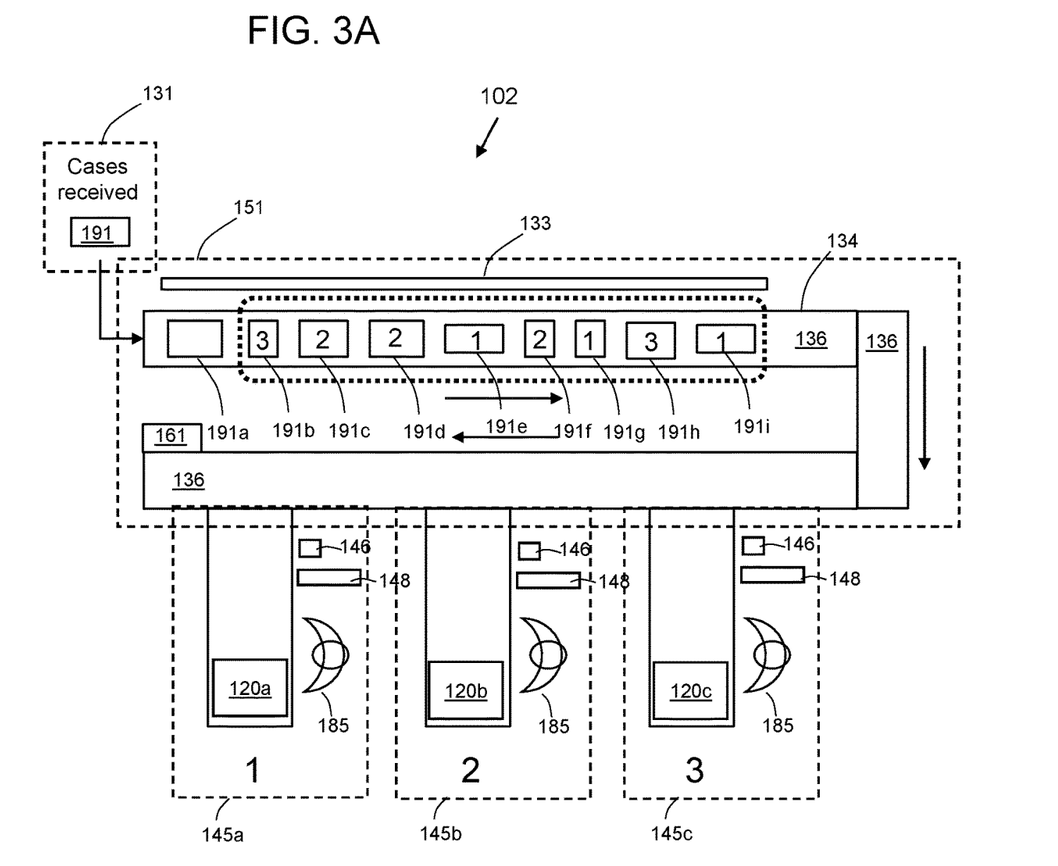
FIG. 3A is a diagram of an exemplary decanting system showing the selection of a subset of product cases and their assignment to specific decanting stations, in accordance with some embodiments.
Figure 3B:
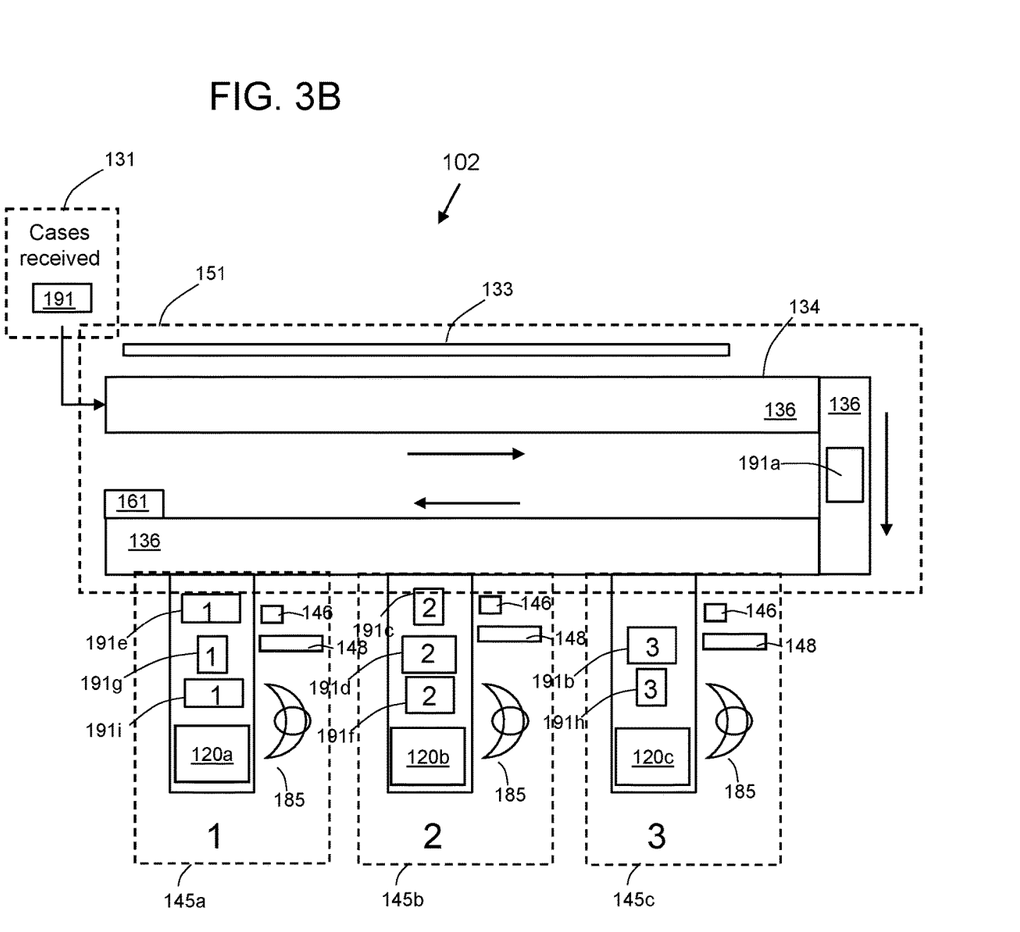
FIG. 3B is a diagram of an exemplary decanting system showing the subset of product cases in FIG. 3A having been transported and diverted to their assigned decanting stations, in accordance with some embodiments.
Figure 4:
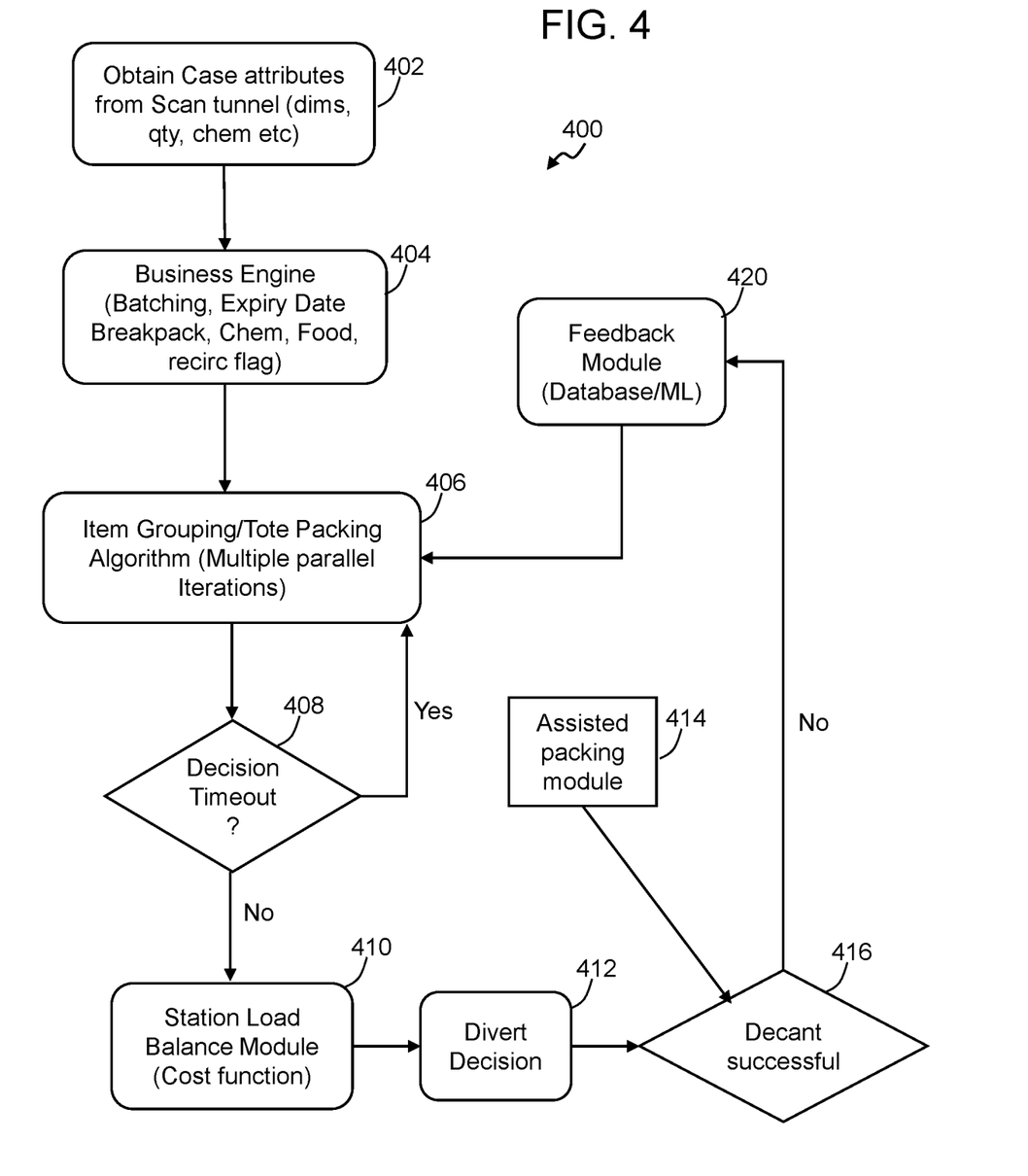
FIG. 4 is a flow diagram of an exemplary process for smart decanting product cases, in accordance with some embodiments.

In conventional systems, newly received product cases are usually randomly diverted to decanting stations for decanting into storage containers, which can result in low tote utilization and increased storage costs. The systems and methods described herein employ certain business rules to optimize tote utilization by assigning and diverting product cases (and/or groups thereof) to particular decanting stations. FIG. 3A, FIG. 3B, and FIG. 4 illustrate this functionality.

FIG. 4 illustrates an exemplary process flow 400 for smart decanting product cases 191 at decanting stations 145a-145c. In some approaches, the control circuit 210 may be configured to analyze the workload of one or more of the decanting stations 145a-145c to identify one or more decanting stations that can accommodate decanting. In step 402, one or more of the sensors 133 associated with the decanting transport system 151 obtain one or more attributes of product cases 191a-191i being transported from the loading zone 131 by the decanting transport system 151 to the decanting stations 145a-145c.

The sensors 133 sense the attributes relating to the product cases as the cases are conveyed by the product advancement surface 136 of conveyor 134 in the direction of the arrow. As noted above, in some approaches, a portion of the product advancement surface 136 may be partially surrounded by a structure housing the one or more sensors 133 and one or more of the sensors 133 may sense or otherwise obtain information regarding various attributes of the product cases 191a-191i as the product cases 191a-191i are conveyed through the structure.

The information or attributes sensed by the one or more sensors 133 may include, for example, an identity of a products in the product cases 191a-191i, a quantity of the products in the product cases 191a-191i, one or more dimensions of the products in the product cases 191a-191i, one or more dimensions of the product cases 191a-191i, a weight of the products in the product cases 191a-191i, and a weight of the product case themselves 191a-191i. In some approaches, the control circuit 210 may receive one or more attributes from the sensors 133 and store some of all of the received information in the electronic inventory management database 170. In some approaches, the control circuit 210 may use at least some of the information to query one or more vendor databases to obtain various information about the products in the cases 191a-191i.

The control circuit 210 selects a subset of the product cases 191a-191i (e.g., product cases 191b-191i, as illustrated in FIG. 3A). The selection of the subset of product cases 191b-191i may be made based on at least some of the information about the product cases received from the one or more sensors 133, obtained from the electronic inventory management database 170, from other vendor sources, and/or based on at least one business rule.

In step 404, the control circuit 210 analyzes at least one business rule governing decanting to assign each product case in the subset (product cases 191b-191i) to one of the decanting stations 145a-145c. Put another way, the control circuit 210 sorts the subset of product cases 191b-191i into groups, each group associated with one of the decanting stations.

In some approaches, one or more of the business rules analyzed may be based on a utilization value for each container 120a-120c at each decanting station 145a-145c, the utilization value representing the total available space in the containers at the available decanting stations when the products from the subset of product cases 191b-191i are decanted and optimally packed into the containers 120a-120c at each decanting station 145a-145c. The control circuit 210 may analyze the quantity, weight, and/or one or more dimensions of the products in each product case 191b-191i in the subset, determine a minimum number of containers needed to decant all of the products into cases at the decanting stations based on a projected utilization value, and/or determine an optimal packing configuration for each container 120a-120c, and then assign particular product cases from the subset to particular decanting stations based one or more of the analyses. The utilization value generally represents the amount of available space in each container. The projected utilization value for a given container may be based on, for example, the volume of space utilized by all products in the container compared to the total volume of the container. In another approach, the projected utilization value for a given container may be based on, for example, the area utilized by the optimally stacked products in the container compared to the total area of the container. In some approaches, the optimum configuration of the product in the container may be a configuration having the greatest product height in the container, (with a maximum height being a height of the container) and a lowest area by the product in the container.

In some approaches, one or more of the business rules analyzed by the control circuit 210 to assign product cases 191b-191i in the subset to the decanting stations 145a-145c may include applying a "brute force" type algorithm. It was found that exhausting all possible solutions would be impractical and overly time consuming. In applying the brute force-type algorithm, the control circuit 210 randomly tries a subset of all possible assignment solutions and selects the best solution. The size of the subset may be set automatically by the control circuit 210 or may be set by an operator based on, for example, computational limitations, time constraints, etc.

In some approaches, one or more of the business rules analyzed by the control circuit 210 to assign product cases in the subset to decanting stations may include applying a "greedy" type algorithm. In applying the greedy-type algorithm, the control circuit 210 continuously assigns product cases in the subset of product cases to decanting stations/containers having the most available space until all of the product cases are assigned to a station.

In one exemplary example of an application of the greedy-type algorithm using FIGS. 3A and 3B for illustration, containers 120a, 120b, and 120c at decanting stations 145a, 145b, and 145c, respectively, are available to receive decanted products. The first container 120a at station 145a has 100% available space; the second container 120b at station 145b has 40% available space, and the third container 120c at station 145c has 75% available space. Container utilization may be determined based on, for example, volume and/or weight as described above. By applying the greedy-type algorithm, the control circuit 210 assigns product case 191i to the first decanting station 145a having container 120a with 100% available space. Assuming the decanted product from case 191i would utilize 30% of the space in container 120a, container 120a would then have 70% available space. The control circuit 210 then updates the space available for container 120a at station 145a and re-runs the greedy-type analysis. That is, the control circuit 210 assigns the next product case 191*h* to the decanting station with a container having the most available space, which would be container 120*c* at station 145*c*, having 75% available space. Assuming the decanted product from case 191*h* would utilize 20% of the space in container 120*c*, container 120*c* would then have 55% available space. The control circuit 210 then updates the space available for container 120*c* at station 145*c* and re-runs the greedy-type analysis for the remaining product cases 191*b*-191*g* in the subset to assign each case in the subset to a decanting station. In some approaches, the control circuit may assign product cases to decanting stations based on the sequence of the cases on the conveyor 134. In other approaches, the control circuit 210 may prioritize case assignments based on the volume and/or weight of the products in the product cases compared to the space available in the containers.

In some approaches, one or more of the business rules analyzed by the control circuit 210 to assign product cases to decanting stations may include applying a "genetic" type algorithm. The genetic-type algorithm is a heuristic approach that imitates the process of natural selection. The objective is to find the optimal breeding logic that produces a solution requiring the fewest number of containers. The process begins by the control circuit 210 randomly shuffling assignments of cases to particular decanting stations to obtain multiple assigned sequences. The control circuit 210 then applies a bin packing algorithm to the containers in each assigned sequence to determine an optimal packing configuration for each container and determines the projected utilization value for each container. The control circuit 210 then assigns a score to each container in each of the assigned sequences and sorts the containers in each sequence based on a selected parameter (e.g., utilization value). The control circuit 210 then combines certain-ranking portions of each sequence to obtain a first generation combined sequence of assignments. The control circuit 210 then repeats the process for a given number of generations to obtain an optimal case assignment sequence.

In some approaches, the control circuit 210 may apply multiple business rules and/or run multiple scenarios using the same of different business rules in parallel or successively to determine optimum grouping and/or assignment decisions. The control circuit 210 may then analyze the outcomes of each scenario/analysis and may determine the groupings and/or assignment decisions based on the outcome(s) requiring the fewest containers to pack all the products from the subset product cases 191*a* and 191*h* into the containers 120*a*-120*c* at the available decanting stations 145*a*-145*c*.

After a given period of time, if the control circuit 210 has not made a successful grouping/assignment decision, the system may timeout (see step 408) and may repeat the analysis in step 404. If the control circuit 210 makes a successful grouping/assignment decision in step 408 (in some approaches the grouping sorting decision may be preliminary, subject one or more factors applied in a subsequent step), the control circuit 210 may apply a cost function analysis to further assist with grouping and/or diverting product cases to particular available decanting stations (see step 410). The cost function may take into account, for example the dimensions and/or weight of the product cases (and/or the products therein), the distance to be traveled by each product case to each available decanting station, the time needed to decant a product case, and/or any other factor that may affect or influence the cost of decanting the product cases at the available decanting stations.

After taking into account the cost function, the control circuit 210 makes a divert decision. In the example illustrated in FIGS. 3A and 3B, product cases 191*a* and 191*h* are sorted into a first group and assigned to decanting station 1 (station 145*a*), product cases 191*c*, 191*d*, and 191*f* are sorted into a second group and assigned to decanting station 2 (station 145*b*), and product cases 191*b* and 191*h* are sorted into a third group and assigned to decanting station 3 (station 145*c*). Product case 191*a*, not included in the subset of product cases selected for decanting, may be included in a subsequent selection of a subset of product cases for decanting that includes new product cases (and/or other unselected product cases) that are loaded onto the conveyor.

The control circuit 210 sends a signal to the control unit 161 to cause the conveyor 134 of the decanting transport system 151 to divert each product case to its assigned decanting station. In the example described above with reference to FIGS. 3A and 3B, product cases 191*a* and 191*h* are conveyed to decanting station 1 (station 145*a*), product cases 191*c*, 191*d*, and 191*f* are conveyed to decanting station 2 (station 145*b*), and product cases 191*b* and 191*h* are conveyed to decanting station 3 (station 145*c*). At the decanting stations 145*a*-145*c*, operators remove the products 190 from the product cases 190 and place them in the one or more containers 120 supplied at each station. Generally, the operator will empty the products from a product case into a container 120 by stacking like products on top of one another until a particular height and/or weight threshold is reached. The operator 185 then proceeds to add any remaining products from the product case to a new container 120 supplied at the decanting station until the product case is fully decanted. The packed containers may then be conveyed electronically or manually to one or more storage locations in a storage structure, for example, associated with an automated storage and retrieval system. For instance, in some aspects, the conveyor 134 associated with the decanting transport system 151 may feed the packed containers to the main conveyor 130 associated with the automated storage and retrieval system 100 illustrated in FIG. 1A and the main conveyor 130 may convey the packed containers to their respective storage locations in the storage structure 110. In other aspects, the packed containers may be conveyed manually or electronically to a suitable storage structure or location that is not associated with an automated storage and retrieval system.

In some approaches, the control circuit 210 may be configured to execute an assisted packing module (e.g., in step 414), which may determine an optimum packing configuration for each container at each decanting station based on the sensed or obtained attributes of the product cases 191 (and/or product therein) diverted to their assigned decanting stations. The assisted packing module may cause the display 148 at the decanting station to illustrate to the operator the optimum packing configurations for the containers.

In step 416, the control circuit 210 determines whether the decanting at each decanting station is successful. If not, the control circuit 210 may send feedback to a feedback module (see step 420). The control circuit 210 may execute the feedback module to improve (e.g., by machine learning) any aspect of the decanting system 102 or any process implemented or executed by the decanting system 102 or any component thereof.

Figure 5:
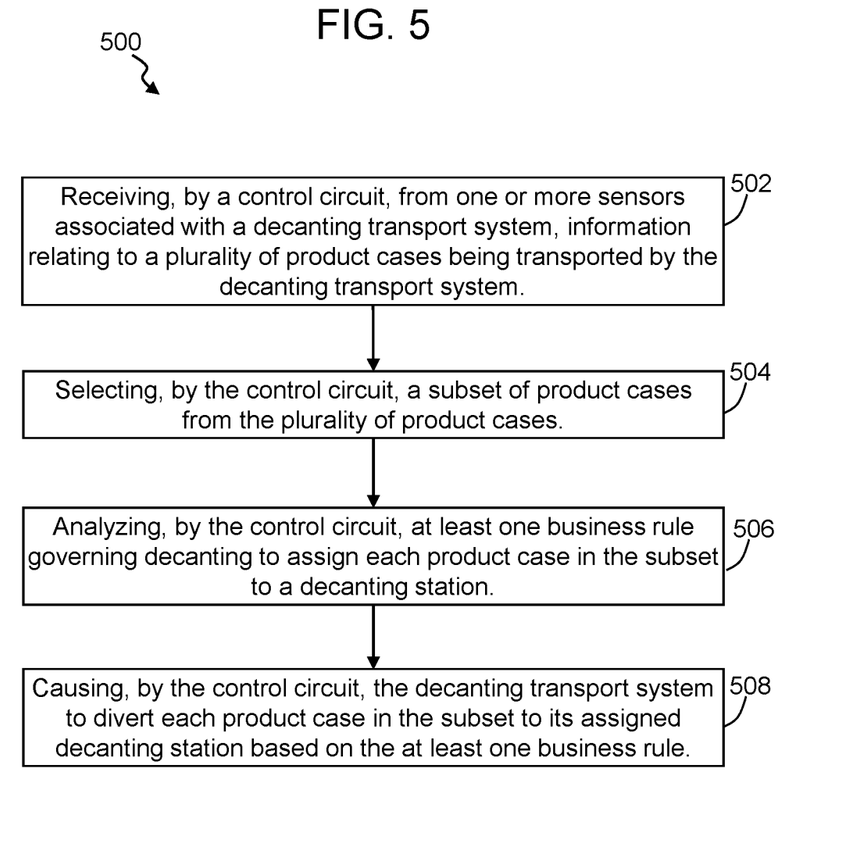
FIG. 5 is a flow diagram of an exemplary process for decanting inventory products from cases at a retail facility, in accordance with some embodiments.

FIG. 5 shows an embodiment of a method 500 of decanting inventory products from cases at a retail facility. In some approaches, the method 500 may be implemented by one or more components of the decanting system 102 described herein with reference to FIGS. 1A to 4. With reference to FIGS. 1A to 5, the exemplary method 500 includes, in step 502, receiving, by a control circuit 210, from one or more sensors 133 associated with a decanting transport system 151, information relating to a plurality of product cases 191 being transported by the decanting transport system 151. Each product case 191 includes a quantity of product 190. In some approaches, the information sensed or otherwise obtained by the one or more sensors 133 may comprise one or more of an identity of a product 190 in the product case 191, a quantity of the product 190 in the product case 191, one or more dimensions of the product 190 in the product case 191, one or more dimensions of the product case 191, a weight of the product 190 in the product case 191, and a weight of the product case 191 itself.

The decanting transport system 151 is configured to transport the product cases 191 from a loading zone 131 to a plurality of decanting stations 145, each decanting station 145 having at least one container 120 associated therewith having an amount of available space for receiving at least one product 190. In some approaches, the control circuit 210 may be configured to analyze the workload of the plurality of decanting stations 145 to identify one or more decanting stations that can accommodate decanting. As each product case 191 is transported by the decanting transport system 151 from the loading zone 131 to one of the decanting stations 145, the one or more sensors 133 obtain information from each product case 191 and transmit the information to a control circuit 210 and/or an electronic inventory management database (e.g., electronic inventory management database 170.)

In step 504, the control circuit 210 selects a subset of product cases 191 from the plurality of product cases being transported by the decanting transport system 151. In some approaches, the control circuit 210 may select the subset of product cases 191 based on at least some of the information about the product cases received from the one or more sensors 133, obtained from the electronic inventory management database 170, from other vendor sources, and/or based on at least one business rule.

In step 506, the control circuit 210 at least one business rule governing decanting to assign each product case 191 in the subset to a decanting station 145. In some approaches, an exemplary business rule analyzed by the control circuit 210 may comprise a rule configured to determine a utilization value for the containers 120 at each decanting station 145 representing an amount of available space in each container. Another exemplary business rule analyzed by the control circuit 210 may comprise a rule configured to determine a cost function associated with diverting each product case 191 to a decanting station 145. Yet another exemplary business rule analyzed by the control circuit 210 may comprise a rule configured to determine a minimum number of containers 120 required to accommodate all the products 190 in the subset of product cases 191. In some approaches, the control circuit 210 may be configured to perform multiple analyses in parallel or successively using one or more same or different business rules and the control circuit may assign each product case 191 to a decanting station 145 based on an analysis outcome requiring the fewest containers.

In step 508, the control circuit sends a signal to a control unit 161 associated with the decanting transport system 151 to cause the decanting transport system 151 divert each product case 191 in the subset to its assigned decanting station 145 based on the at least one business rule. In some scenarios, at least two product cases 191 from the subset of product cases maybe assigned to and diverted to different available decanting stations 145 based on the at least one business rule. In some scenarios, at least two product cases 191 in the subset of product cases may be assigned to and diverted to the same decanting station 145 based on the at least one business rule.

The systems and methods described herein advantageously allow retail facilities to automatically optimize storage space utilization of storage containers in automated storage and retrieval systems via smart decanting. The systems and methods describe herein thus provide significant operation efficiency and operation cost reduction for the retailers.

In some embodiments, a system for decanting inventory products from cases at a retail facility comprises: a loading zone configured to receive product cases, each product case containing a quantity of a product; a plurality of decanting stations, each decanting station having at least one container associated therewith, each container having an amount of available space for receiving at least one product; a decanting transport system configured to transport the product cases from the loading zone to the decanting stations, the decanting transport system comprising one or more sensors configured obtain information relating to the product cases; a control unit operatively coupled to the decanting transport system and configured to control movement of the decanting transport system; and a control circuit communicatively coupled to the control unit, the control circuit being configured to: receive, from the one or more sensors, information relating to a plurality of product cases being transported from the loading zone by the decanting transport system; select a subset of product cases from the plurality of product cases; analyze at least one business rule governing decanting to assign each product case in the subset to a decanting station; and cause the decanting transport system to divert each product case in the subset to its assigned decanting station based on the at least one business rule.

In some embodiments, a method of decanting inventory products from cases at a retail facility comprises: receiving, by a control circuit, from one or more sensors associated with a decanting transport system, information relating to a plurality of product cases being transported by the decanting transport system, each product case containing a quantity of product, wherein the decanting transport system is configured to transport the product cases from a loading zone to a plurality of decanting stations, each decanting station having at least one container associated therewith having an amount of available space for receiving at least one product; selecting, by the control circuit, a subset of product cases from the plurality of product cases; analyzing, by the control circuit, at least one business rule governing decanting to assign each product case in the subset to a decanting station; and causing, by the control circuit, the decanting transport system to divert each product case in the subset to its assigned decanting station based on the at least one business rule.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for decanting inventory products from cases at a retail facility, the system comprising:
   a loading zone configured to receive product cases, each product case containing a quantity of a product;

a plurality of decanting stations, each decanting station having at least one container associated therewith, each container having an amount of available space for receiving at least one product;

a decanting transport system comprising a conveyor having a product advancement surface configured to transport the product cases from the loading zone to the decanting stations, the decanting transport system comprising one or more sensors configured to obtain information relating to the product cases as they are conveyed by the conveyor;

a control unit operatively coupled to the decanting transport system and configured to control movement of the conveyor; and a control circuit communicatively coupled to the control unit, the control circuit being configured to:
  receive, from the one or more sensors, information relating to a plurality of product cases conveyed by the conveyor;
  select a subset of product cases from the plurality of product cases, wherein the subset comprises at least two product cases from the plurality of product cases;
  apply a container-packing algorithm to the subset of product cases and the containers at the decanting stations to determine a minimum number of containers needed to decant all of the products in the subset of product cases into the containers based on a projected utilization of each container, the projected utilization of each container being determined by the control circuit based on one or more dimensions of the products and an optimal packing configuration of the products when the products are stacked in the containers, wherein the optimal packing configuration is a projected packing configuration having a greatest height of the products in the container, with a maximum height being a height of the container, and a lowest area of the products in the container;
  assign each product case in the subset to one of the plurality of decanting stations based on the optimal packing configurations of the products in the containers;
  cause the conveyor to divert each product case in the subset to its assigned decanting station; and
  cause the conveyor to recirculate non-selected ones of the plurality of product cases for selection into a subsequent subset of product cases.

2. The system of claim 1, wherein each decanting station further comprises a user display and the control circuit is configured to cause the user display to display an instruction for packing the products from the product cases into the container.

3. The system of claim 1, wherein the control circuit is configured to analyze a workload of the plurality of decanting stations to identify one or more decanting stations that can accommodate decanting.

4. The system of claim 1, wherein the control circuit is further configured to determine a cost function associated with diverting each product case in the subset of product cases to each decanting station and cause the product cases to be diverted to assigned decanting stations based also on the cost functions.

5. The system of claim 1, wherein the information relating to the product cases comprises one or more of an identity of a product in the product case, a quantity of the product in the product case, one or more dimensions of the product in the product case, one or more dimensions of the product case, a weight of the product in the product case, and a weight of the product case.

6. The system of claim 1, wherein at least two product cases in the subset are assigned to and diverted to different decanting stations.

7. The system of claim 1, wherein at least two product cases in the subset are assigned to and diverted to a same decanting station.

8. The system of claim 1, wherein the control circuit is further configured to apply another container-packing algorithm to the subset of product cases and the containers at the decanting stations and the control circuit assigns each product case in the subset to a decanting station.

9. A method of decanting inventory products from cases at a retail facility, the method comprising:
  receiving, by a control circuit, from one or more sensors associated with a decanting transport system, information relating to a plurality of product cases being transported by a conveyor having a product advancement surface, each product case containing a quantity of product, wherein the conveyor of the decanting transport system is configured to transport the product cases from a loading zone to a plurality of decanting stations, each decanting station having at least one container associated therewith having an amount of available space for receiving at least one product;
  selecting, by the control circuit, a subset of product cases from the plurality of product cases, wherein the subset comprises at least two product cases from the plurality of product cases;
  applying, by the control circuit, a container-packing algorithm to the subset of product cases and the containers at the decanting stations to determine a minimum number of containers needed to decant all of the products in the subset of product cases into the containers based on a projected utilization of each container, the projected utilization of each container being determined by the control circuit based on one or more dimensions of the products and an optimal packing configuration of the products when the products are stacked in the containers, wherein the optimal packing configuration is a projected packing configuration having a greatest height of the products in the container, with a maximum height being a height of the container, and a lowest area of the products in the container;
  assigning, by the control circuit, each product case in the subset to one of the plurality of decanting stations based on the optimal packing configurations of the products in the containers;
  causing, by the control circuit, the conveyor to divert each product case in the subset to its assigned decanting station; and
  causing the conveyor to recirculate non-selected ones of the plurality of product cases for selection into a subsequent subset of product cases.

10. The method of claim 9, further comprising causing, by the control circuit, a user display of each decanting station to display an instruction for packing the products from the product cases into the container.

11. The method of claim 9, further comprising analyzing, by the control circuit, a workload of the plurality of decanting stations to identify one or more decanting stations that can accommodate decanting.

12. The method of claim 9, wherein the control circuit is further configured to determine a cost function associated with diverting each product case in the subset of product cases to each decanting station and configured to cause the product cases to be diverted to assigned decanting stations based also on the cost functions.

13. The method of claim 9, wherein the information relating to the product cases comprises one or more of an identity of a product in the product case, a quantity of the product in the product case, one or more dimensions of the product in the product case, one or more dimensions of the product case, a weight of the product in the product case, and a weight of the product case.

14. The method of claim 9, wherein at least two product cases in the subset are assigned to and diverted to different decanting stations.

15. The method of claim 9, wherein at least two product cases in the subset are assigned to and diverted to a same decanting station.

16. The method of claim 9, further comprising:
   applying, by the control circuit, another container-packing algorithm to the subset of product cases and the containers at the decanting stations; and
   assigning, by the control circuit, each product case in the subset to a decanting station.

17. The system of claim 1, wherein the control circuit is further configured to determine optimum groupings of the product cases and the control circuit assigns each grouping to a decanting station.

18. The method of claim 9, wherein the control circuit is further configured to determine optimum groupings of the product cases and the control circuit assigns each grouping to a decanting station.

\* \* \* \* \*